United States Patent
Nadler

(10) Patent No.: US 11,393,212 B2
(45) Date of Patent: Jul. 19, 2022

(54) SYSTEM FOR TRACKING AND VISUALIZING OBJECTS AND A METHOD THEREFOR

(71) Applicant: Darvis, Inc., San Francisco, CA (US)

(72) Inventor: Ingo Nadler, Bad Breisig (DE)

(73) Assignee: Darvis, Inc., San Francisco, CA (US)

(*) Notice: Subject to any disclaimer, the term of this patent is extended or adjusted under 35 U.S.C. 154(b) by 0 days.

(21) Appl. No.: 16/372,978

(22) Filed: Apr. 2, 2019

(65) Prior Publication Data
US 2019/0325230 A1 Oct. 24, 2019

Related U.S. Application Data

(60) Provisional application No. 62/660,320, filed on Apr. 20, 2018.

(51) Int. Cl.
| | | |
|---|---|---|
| *G06V 20/52* | (2022.01) | |
| *G06T 15/00* | (2011.01) | |
| *G06V 20/40* | (2022.01) | |

(52) U.S. Cl.
CPC .......... *G06V 20/53* (2022.01); *G06T 15/005* (2013.01); *G06V 20/46* (2022.01)

(58) Field of Classification Search
CPC ........ G06V 20/53; G06V 20/52; G06V 20/46; G06K 9/00778; G06K 9/00771; G06K 9/00744; G06T 15/005
See application file for complete search history.

(56) References Cited

U.S. PATENT DOCUMENTS

| | | | |
|---|---|---|---|
| 6,697,103 B1 * | 2/2004 | Fernandez | ....... G08B 13/19608 |
| | | | 348/143 |
| 10,045,120 B2 * | 8/2018 | Adsumilli | ............ G01S 3/7864 |
| (Continued) | | | |

FOREIGN PATENT DOCUMENTS

| | | | | |
|---|---|---|---|---|
| EP | 0005954 A1 | 12/1979 | | |
| WO | WO-2008103929 A2 * | 8/2008 | ........... G06F 16/784 |

OTHER PUBLICATIONS

E. R. Corral-Soto et al., "3D Town: The Automatic Urban Awareness Project," 2012 Ninth Conference on Computer and Robot Vision, 2012, pp. 433-440, doi: 10.1109/CRV.2012.64. (Year: 2012).*

(Continued)

*Primary Examiner* — Michael Robert Cammarata
(74) *Attorney, Agent, or Firm* — Ziegler IP Law Group, LLC

(57) ABSTRACT

A system that tracks and visualizes objects in a surveillance area, when the system is in operation. The system includes a plurality of sensors and a server arrangement. The server arrangement includes a first module and a second module. The first module is configured to extract features to identify objects in the surveillance area based on acquired data from sensors, determine object type for identified objects based on extracted features, and generate a unique object identity based on the object type. The second module is configured to acquire the unique object identity for an object to be tracked, calculate a geospatial location of the object based on a position of sensors associated, determine a change in the geospatial location of the object to be tracked, and generate a virtual representation of the object indicative of movement of object to be tracked.

16 Claims, 7 Drawing Sheets

(56) References Cited

U.S. PATENT DOCUMENTS

| | | | |
|---|---|---|---|
| 2006/0077254 A1* | 4/2006 | Shu | G08B 13/19608 348/143 |
| 2010/0013931 A1* | 1/2010 | Golan | G06V 20/52 348/150 |
| 2010/0194883 A1* | 8/2010 | Busch | G06K 9/2081 348/143 |
| 2015/0364028 A1* | 12/2015 | Child | G08B 1/08 348/143 |
| 2016/0019427 A1* | 1/2016 | Martin | G06V 40/10 382/103 |
| 2017/0177946 A1* | 6/2017 | Citerin | G06K 9/4671 |
| 2017/0178345 A1* | 6/2017 | Pham | G06T 7/277 |
| 2019/0080178 A1* | 3/2019 | To | G06V 20/52 |
| 2019/0114563 A1* | 4/2019 | Yukimoto | G07C 9/00 |
| 2019/0259201 A1* | 8/2019 | Duca | G06F 3/013 |
| 2019/0294889 A1* | 9/2019 | Sriram | G06V 20/584 |
| 2022/0019769 A1* | 1/2022 | Kawase | G06V 20/52 |

OTHER PUBLICATIONS

A. Calbi, C. S. Regazzoni and L. Marcenaro, "Dynamic Scene Reconstruction for Efficient Remote Surveillance," 2006 IEEE International Conference on Video and Signal Based Surveillance, 2006, pp. 99-99, doi: 10.1109/AVSS.2006.45. (Year: 2006).*

* cited by examiner

SYSTEM FOR TRACKING AND VISUALIZING OBJECTS AND A METHOD THEREFOR

TECHNICAL FIELD

The present disclosure relates generally to surveillance systems; and more specifically, to a system for tracking and visualizing objects in a surveillance area. Furthermore, the present disclosure relates to a method for tracking and visualizing objects in a surveillance area.

BACKGROUND

In recent years, safety and security have emerged as major concerns. Typically, surveillance systems are employed for tracking people and vehicles. The surveillance systems are conventionally employed in schools, houses, airports, railway stations, hotels, state government buildings, tourist places and other crowded places. The conventional surveillance systems are known for being able to detect and track suspicious people, criminals, fugitives and the like.

However, the conventional surveillance systems have several problems associated therewith. One major contemporary problem is that data obtained from monitoring a particular area has to be analyzed manually. The manual analysis is not only a tedious task, but is also prone to inaccuracies. Furthermore, manual analysis of such data potentially raises privacy concerns. Another major problem associated with the conventional surveillance systems is that such systems are not capable of reporting an unusual activity in a particular area; for example, detection of a weapon in a highly restricted zone. Furthermore, the conventional surveillance systems typically fail to identify a state of a given object or trends associated with a particular area, and/or to notify an authority or general masses regarding the same. Furthermore, the conventional systems do not provide a representation of the monitored area in real-time with high accuracy. It will be appreciated that there is a need for reliable identification and localization of entities, for example potentially unsafe entities to prevent crimes and the like. So far, the effectiveness of conventional surveillance system is inadequate for many use situations.

Automated surveillance systems (for example, Vicom T0208/84, European patent application EP79300903.6) are known, but do not provide adequate performance for contemporary use. Therefore, in light of the foregoing discussion, there exists a need to overcome the aforementioned drawbacks associated with conventional surveillance systems and their techniques for tracking and visualizing objects. In particular, there is a need to provide computing systems that are specifically configured for visualizing monitored data in real-time.

SUMMARY

The present disclosure seeks to provide an improved system for tracking and visualizing objects in a surveillance area. Furthermore, the present disclosure also seeks to provide an improved method for identifying, tracking and visualizing objects in a surveillance area. The present disclosure seeks to provide a solution to the existing problem of a lack of accurate, reliable and graphically intuitive representations for tracking and visualizing objects. An aim of the present disclosure is to provide a system that at least partially overcomes the problems encountered in the prior art, and allows for efficiently tracking and visualizing objects in a surveillance area. The present disclosure provides at least a partial solution to the aforementioned technical problems associated with conventional surveillance systems.

In one aspect, an embodiment of the present disclosure provides a system that tracks and visualizes objects in a surveillance area, the system comprising:
  a plurality of sensors arranged in the surveillance area for acquiring data;
  a first database;
  a server arrangement communicatively coupled to the plurality of sensors to obtain the acquired data therefrom, the server arrangement comprising:
    a first module configured to:
      extract features from the obtained data to identify objects in the surveillance area;
      determine an object type for each of the identified objects in the surveillance area based on the extracted features of the respective objects;
      generate a unique object identity based on the object type for each of the identified objects in the surveillance area; and
      store the unique object identity for each of the identified objects in the first database; and
    a second module configured to:
      acquire the unique object identity for an object to be tracked from the first database;
      calculate a geospatial location of the object to be tracked based on a position of the plurality of sensors associated therewith;
      determine a change in the geospatial location of the object to be tracked in the surveillance area; and
      generate a virtual representation of the object to be tracked indicative of a movement of the object to be tracked due to change in the geospatial location thereof.

Optionally, the first module is configured to transform, (namely transforms when in operation) the coordinates of an image plane from a first reference system to the corresponding coordinates in a map in a second reference system, for calculating the geospatial location of each of identified objects in the surveillance area.

Optionally, the server arrangement is associated with a second database having a list of wanted entities and, optionally, one or more properties associated with each of the wanted entities.

Optionally, the second module is further configured to:
  compare the unique object identities for each of the identified objects in the surveillance area with each of the wanted entities in the list of wanted entities;
  determine if the unique object identities for any of the identified objects in the surveillance area matches with one or more of the wanted entities; and
  generate a virtual representation of the determined object with the unique object identity matching with one or more of the wanted entities.

Optionally, the second module is further configured to generate an alert if the unique object identity for any of the identified objects in the surveillance area matches with one or more of the wanted entities.

Optionally, the second module is further configured to generate graphical representations based on statistical data of the identified objects in the surveillance area.

Optionally, the user device is further configured to render the generated graphical representation based on the movement of the identified objects.

Optionally, the plurality of sensors comprises a microphone arrangement to acquire sounds in the surveillance area, and wherein the first module is configured to:
- analyze the acquired sound for presence of one or more of predetermined keyword and content therein, from a set of predetermined keywords and contents; and
- calculate a point of origin of the acquired sounds in the surveillance area related with the presence of one or more of predetermined keyword and content therein based on a direction thereof with respect to the microphone arrangement, and wherein the second module is configured to:
- generate a virtual representation of the object associated with the acquired sounds related with the presence of one or more of predetermined keyword and content, with the calculated point of origin being the geospatial location for the object.

Optionally, the plurality of sensors comprises one or more of: a camera, a LIDAR, a cell tower, a Bluetooth® beacon and an audio beacon.

Optionally, the first module is further configured to analyze the acquired data from the plurality of sensors to extract auxiliary information pertaining to objects in the surveillance area, and wherein the second module is further configured to modulate the virtual representation of the object to be tracked based on the auxiliary information extracted therefor.

Optionally, the system further comprises a user device communicatively coupled to the server arrangement, wherein the user device is configured to render the virtual representation of a movement of the identified objects in the surveillance area.

Optionally, the user device is configured to visualize the identified objects in one or more of: a virtual reality environment, an augmented reality environment, a mixed reality environment and a web viewer.

Optionally, a user interface associated with a user device, wherein the user interface allows a user to generate a user input to search for one or more properties associated with a particular object in order to determine a current location thereof.

In another aspect, an embodiment of the present disclosure provides a computer implemented method for tracking and visualizing objects in a surveillance area, the method comprising:
- acquiring data from a plurality of sensors in the surveillance area;
- extracting features from the acquired data to identify objects in the surveillance area;
- determining an object type for each of the identified objects based on the extracted features of the respective objects;
- generating a unique object identity based on the object type for each of the identified objects in the surveillance area;
- acquiring the unique object identity for an object to be tracked;
- calculating a geospatial location of the object to be tracked based on a position of the plurality of sensors associated therewith;
- determining a change in the geospatial location of the object to be tracked in the surveillance area; and
- generating a virtual representation of the object to be tracked indicative of a movement of the object to be tracked due to change in the geospatial location thereof.

Optionally, the method further comprises rendering, by a user device, the virtual representation of a movement of the identified objects in the surveillance area.

Optionally, the method comprises transforming the coordinates of an image plane from a first reference system to the corresponding coordinates in a map in a second reference system, for calculating the geospatial location of each of identified objects in the surveillance area.

Optionally, the method further comprises:
- acquiring a list of wanted entities and, optionally, one or more properties associated with each of the wanted entities;
- comparing the object identities for each of the identified objects in the surveillance area with each of the wanted entities in the list of wanted entities;
- determining if the object identity for any of the identified objects in the surveillance area matches with one or more of the wanted entities; and
- generating a virtual representation of the determined object with the object identity matching with one or more of the wanted entities.

Optionally, the method further comprises generating an alert if the object identity for any of the identified objects in the surveillance area matches with one or more of the wanted entities.

Optionally, the method further comprises generating graphical representations based on statistical data of the identified objects in the surveillance area.

Optionally, the method further comprises rendering the generated graphical representation on a user device, based on the movement of the identified objects.

Embodiments of the present disclosure substantially eliminate, or at least partially address, the aforementioned problems in the prior art, and provides a system for efficiently tracking and visualizing objects in the surveillance area. The present disclosure reduces an effort of a user that is required to analyze data obtained from sensors efficiently. Furthermore, the disclosed system improves the accuracy of tracking and visualization of objects.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In overview, the embodiments of the present disclosure are concerned with a system for tracking and visualizing objects in a surveillance area. Furthermore, the embodiments of the present disclosure also provide a method for tracking and visualizing objects in a surveillance area.

Figure 1:
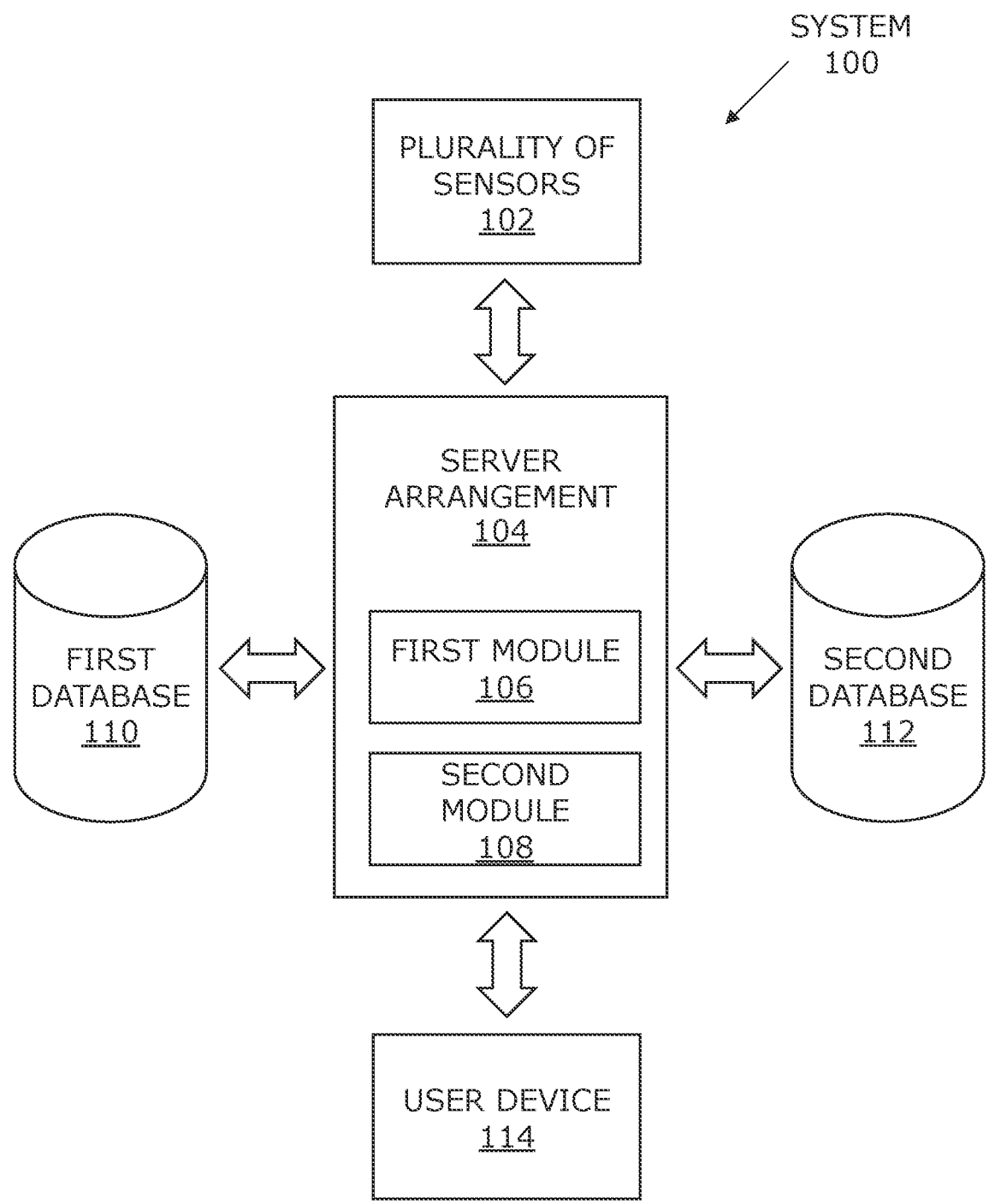
FIG. 1 is an illustration of a block diagram of a system for tracking and visualizing objects in a surveillance area, in accordance with an embodiment of the present disclosure.

Referring to FIG. 1, there is provided an illustration of a block diagram of a system 100 for tracking and visualizing objects in a surveillance area, in accordance with an embodiment of the present disclosure. For illustration purposes only, there will now be considered an exemplary environment, wherein the system 100 for tracking and visualizing objects is implemented pursuant to embodiments of the present disclosure. As shown, the system 100 for tracking and visualizing objects in the surveillance area comprises a plurality of sensors 102 and a server arrangement 104 that is communicatively coupled to the plurality of sensors 102. The server arrangement 104 comprises a first module 106 and a second module 108. Furthermore, the system 100 comprises a first database 110 and a second database 112. For the sake of simplicity and clarity, the first database 110 and the second database 112 are sometimes collectively referred to as a "database arrangement" without any limitations. In some other examples, the database arrangement may be separate from the server arrangement 104 and is communicatively coupled to the server arrangement 104, without departing from the scope of the present disclosure. Furthermore, the system 100 comprises a user device 114 associated with a user of the system 100 for tracking and visualizing objects. The user device 114 is disposed in communication with the server arrangement 104; such communication is beneficially implemented wirelessly, for example.

It will be appreciated that FIG. 1 is merely an example, which should not unduly limit the scope of the claims herein. It is to be understood that the specific designation for the system 100 for tracking and visualizing objects is provided as an example and is not to be construed as limiting the system 100 to specific numbers, types, or arrangements of user devices (such as user device 114), servers, a plurality of sensors (such as sensors 102), and database arrangements (such as the first database 110 and the second database 112). A person skilled in the art will recognize many variations, alternatives, and modifications of embodiments of the present disclosure.

Throughout the present disclosure, the term "server arrangement" relates to a structure and/or module that includes programmable and/or non-programmable components configured (namely, functioning when in operation) to store, to process and/or to share information. Optionally, the server arrangement includes any arrangement of physical or virtual computational entities capable of enhancing information to perform various computational tasks. Furthermore, it will be appreciated that the server arrangement 104 is optionally implemented as single hardware server and/or a plurality of hardware servers operating in a parallel architecture or a distributed architecture. In an example, the server arrangement 104 optionally includes components such as a data memory, a processor, a network adapter and the like, to store, to process and/or to share information with other computing components, such as user device/user equipment. Optionally, the server arrangement 104 is implemented as a computer program that provides various services (such as database service) to other devices, modules or apparatus.

According to an embodiment, the plurality of sensors 102 are arranged in a surveillance area for acquiring data. Throughout the present disclosure, the term "sensors" as used herein refers to an assembly of arrangement of a number of sensors 102 and if necessary, any other peripheral devices or components required for operation of the sensors, and transmittance or communication of the sensor data. Herein, the sensors 102 are implemented as a device that detects (and possibly responds to) signals, stimuli or changes in quantitative and/or qualitative features of a given system, or the environment in general, and provides a corresponding output. The output is generally a signal that can be converted to human-readable format at the sensor location or transmitted electronically over a data communication network for reading or further processing remotely. Additionally, the sensors 102 optionally include any device which can provide a form of perceived perceptual information. In particular, the plurality of sensors 102 are configured (namely, function when in operation) to acquire data for monitoring the surveillance area. In an example, the data acquired by the plurality of sensors 102 is optionally representative of a number of vehicles on a street, a number of people on a street, a number of obstacles on a street hindering the traffic thereon, movement of vehicles and people and so forth. The data acquired by the sensors 102 is used to monitor activity in the surveillance area. The plurality of sensors 102 include, but are not limited to, cameras, microphone arrangements, LIDARs, cell towers, Bluetooth® beacons, audio beacons or a combination thereof. Optionally, the plurality of sensors 102 includes motion detectors, magnetic anomaly detectors, metal detectors, weapon detectors, radiation detectors and so forth. In an example, the sensors 102 are employed at the entrance of buildings, houses, shopping malls and the like to keep a check on people entering and leaving the building. In another example, the sensors 102 are employed at traffic signals to track traffic of vehicles and people. In yet another example, the sensors 102 are mounted on unmanned aerial vehicles (UAVs), micro aerial vehicles (MAVs) and the like to effectively acquire data pertaining to a particular object or an area. The data provided by the sensors 102 is optionally generated in different formats that include, but are not limited to, .JPEG, .MP3, .MP4, .XML, and .JSON formats. Optionally, the sensors 102 include transmitters to transmit the data acquired from the surveillance area. The sensors 102 are configured (namely, function when in operation) to transmit data over a communication network (not shown).

Throughout the present disclosure, the term "communication network" as used herein refers to an arrangement of interconnected programmable and/or non-programmable components that are configured to facilitate data communication between one or more electronic devices and/or databases, whether available or known at the time of filing or as later developed. Furthermore, the network optionally includes, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet®, a private network, a cellular network and any other communication system or systems at one or more locations. Additionally, the network includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Moreover, although the system 100 is frequently described herein as being implemented with TCP/IP communications protocols, the system 100 is also optionally implemented using IPX, AppleTalk, IP-6, NetBIOS, OSI, any tunneling protocol (e.g. IPsec, SSH), or any number of existing or future protocols.

Throughout the present disclosure, the term "surveillance area" as used herein refers to an area which is monitored for security and/or analysis for patterns or statistics. Generally, the surveillance area is the coverage area of the plurality of sensors 102 arranged therein. The surveillance area is optionally a stationary venue such as a building or a mobile venue such as mass transit vehicles including trains, buses, ferries, aircraft, automobiles and so forth. In some examples, the surveillance area is not be a well-defined area. Herein, the surveillance area depends on the area over which the plurality of sensors 102 are arranged. In an example, a plurality of sensors 102 are arranged in a private path to a house; herein, the private path is considered as the surveillance area. In another example, a plurality of sensors 102 are arranged throughout a city; herein, the city is the surveillance area. In present examples, the surveillance area is monitored for unidentified vehicles in a security zone, unattended baggage at airports, unidentified people in a high security zone, wanted people such as fugitives, criminals and so forth.

According to an embodiment, the first module 106 is configured (namely, is functional when in operation) to extract features from the obtained data (as acquired by the sensors 102) to identify objects in the surveillance area. That is, the data obtained from the plurality of sensors 102 is analyzed in order to retrieve information to identify objects in the surveillance area. In one or more embodiments, the first module 106 is configured to compare the extracted features of the object to other objects of the same object type from a data base of known objects in order to identify objects in the surveillance area. Herein, a number of feature extraction techniques are employed to extract features from the acquired data for object detection. Furthermore, machine learning algorithms are beneficially employed for implementing object recognition; machine learning algorithms are susceptible to being configured via initial teaching data, and are subsequently capable of progressively reconfiguring themselves in an adaptive manner depending on a nature of data being processed therethrough and a rate of success of the object recognition provided. There are several processing operations known in the art for object detection and object recognition. Optionally, the processing techniques include filtering of unwanted data or noise, color or intensity adjustments, resolution adjustments, feature extraction, object integration, object recognition, rotation, zooming, cropping and several other processing operations for object identification. Notably, the feature extraction techniques are capable of distinguishing a tree from a vehicle, a vehicle from a human, a human from an animal and the like. Furthermore, the feature extraction techniques are employed for determining the structure, size, shape of each of the plurality of objects under analysis.

Optionally, the first module 106 is configured (namely, functional when in operation) to determine at least one area of interest based on a user input. The area of interest is an area with defined coordinates within the surveillance area that is to be monitored based on the user input. Notably, the surveillance area is monitored for an extended field of view analysis, whereas the area of interest is monitored for a closer analysis within the surveillance area. However, it will be appreciated that the terms "surveillance area" and "area of interest" do not distinguish immensely in meaning, and the two terms have been interchangeably used throughout the disclosure. As an example, the surveillance area may be a city, and a particular street within the city is the area of interest. The surveillance area and area of interests can be configured in any 2D or 3D representation of the surveillance area, such as a map, a ground/floor plan or a 3D model. Herein, the areas of interest are used to generate statistical subsets of object data in the surveillance area. In a mall, for example, while the surveillance area can provide the total number of customers, whereas an area of interest in the shoe wear aisle may provide information about how many of these customers (potentially male/female) have been visiting the shoe aisle and for how long. Optionally, the coordinates of the area of interest are determined based on the user input. In an example, the user input can be textual, voice input, or gestures (as in case of virtual reality). In another example, a map can be presented on the user device 114 and the user is prompted to define the area of interest on the map by selecting an area on the map. Throughout the present disclosure, the term "user" as used herein relates to any entity including a person (i.e., human being) or a virtual personal assistant (an autonomous program or a bot) using a device and/or system described herein.

Optionally, the first module 106 comprises one or more processors, for example a plurality of processors) to perform the functions as described. The term "processor" as used herein refers to a computational element that is operable to respond to and processes instructions that drive the system. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that is shared by other processing devices. Additionally, the one or more individual processors, processing devices and elements are arranged in various architectures for responding to and processing the instructions that drive the system 100.

Optionally, the first module 106 is configured (namely, is functional when in operation) to determine one or more sensors 102 from the plurality of sensors 102 that efficiently cover the area of interest. In other words, the first module 106 is configured to obtain data from one or more sensors 102 associated with the area of interest. In particular, the first module 106 selects the one or more sensors 102, the data from which are in accordance with the user input. In an example, the user input is "How is the traffic on 24th street?". Herein, the area of interest is 24th street and one or more sensors 102 that can effectively determine the flow of traffic on 24th street are selected. In an example, the data can be obtained from the one or more sensors 102 in real-time. In another example, the data can be retrieved from a database wherein the data from the one or more sensors 102 is stored.

Furthermore, the first module 106 is configured (namely, is functional when in operation) to analyze the data for information acquired from the one or more sensors 102 in the area of interest. The information optionally includes a number of objects, a geospatial location of the objects, and a distance between each of the objects. In an example, the number of objects are determined by segmentation techniques known in the art. Optionally, the first module 106 is configured (namely, is functional when in operation) to acquire auxiliary information pertaining to an object. The auxiliary information optionally includes a shape of the object, a gender of the object, a size of the object, a color of the object and so forth. Furthermore, the first module 106 determines an object type for each of the identified objects in the surveillance area based on the extracted features of the respective objects. In an example, the object type is a vehicle, an animal, a building, a person, an obstacle, and so forth.

In an example, the plurality of sensors 102 comprise a camera configured (namely, functional when in operation) to acquire images and videos for monitoring the surveillance area. It will be appreciated that the accuracy in detection of an object and specifically the type of the object will depend on the resolution of the images and videos acquired by the cameras arranged in the surveillance area. A higher resolution of the images will yield more accurate results for the present processes in comparison to using a low resolution of the images. The term "resolution" of a given image source as used herein refers to a display resolution of the given image source. Notably, the display resolution of the given image source refers to pixel density (namely, pixels per unit area) within the given image source. It will be appreciated that an image resolution of a given image is same as the resolution of the given image source by which a given image is acquired. The term "image resolution" refers to a detail that a given image holds. The image resolution is typically measured as the number of pixel values per unit area associated with a given image. Notably, the cameras are employed to have wide-angle view of the surveillance area as well as the zoomed view of the area of interest in high resolution. In an example, stationary cameras are installed for a wide field of view analysis of the surveillance area, and dynamic cameras (configured to rotate about an axis) for a detailed analysis of the area of interest. With high resolution images obtained, the system 100 is capable of accurately reading a license plate of a vehicle, recognize human face and so forth, for example from a reading distance in up to 50 meters, optionally up to 100 meters, and yet more optionally up to 500 meters.

Furthermore, the first module 106 is configured (namely, is functional when in operation) to generate a unique object identity for each of the plurality of identified objects in the surveillance area. The unique object identity is generated based on the object type for each of the identified objects and the features extracted from each of the identified objects. In one or more embodiments involving comparing the extracted features of the object to other objects of the same object type from a data base, if the object features do not match any other object, a unique object identity is assigned to the object; otherwise, the object is assigned the object identity of the matching object. The unique object identity is unique to each of the plurality of objects as the features for each of the objects are different. Notably, in a case of two identical vehicles, the distinguishing feature is potentially the license numbers on each of the two vehicles. Optionally, the unique object identity is a random number generated by the first module 106 based on the features of the object. In an example, the unique object identity is a feature vector that is generated based on the features extracted from an object. Therefore, the unique object identity generated for each of the plurality of objects is different for two distinguishable objects. However, if the unique object identity is generated more than once for the same object, the generated unique object identity will be same. Notably, the unique object identity for a particular object is location-independent, and is dependent on the features of that particular object for which the unique object identity is generated. It will be appreciated that the property of the system 100 of generating the same unique object identity for the same object is advantageous for tracking the object in the surveillance area without ambiguity.

Furthermore, the first module 106 is configured (namely, is functional when in operation) to store the unique object identity for each of the identified objects in the first database 110. It will be appreciated that the data stored in the first database 110 is the unique object identity instead of the images acquired from the sensors, thereby maintaining the anonymity of the objects such as people and vehicles. The information stored in the first database 110 is beneficial for pattern generation and also for tracking of individual objects in the surveillance area. Optionally, the object type, the unique object identity and the geospatial location associated therewith is stored in the first database 110 along with a time stamp. It will be appreciated that the time stamp along with the information facilitates the retrieval of data from the first database 110.

Throughout the present disclosure, the term "database" as used herein refers to an organized body of digital information regardless of a manner in which the data or the organized body thereof is represented. Optionally, the database is hardware, software, firmware and/or any combination thereof. For example, the organized body of related data is in a form of a table, a map, a grid, a packet, a datagram, a file, a document, a list or in any other form. The database includes any data storage software and systems, such as, for example, a relational database such as IBM DB2® and Oracle 9®. In some examples, the database may include fast GPU based databases like 'MapD' or 'SQream' as known in the art. Optionally, the database is used interchangeably herein to describe a database management system, as is common in the art. Furthermore, the database management system refers to the software program for creating and managing one or more databases. Optionally, the database supports relational operations, regardless of whether it enforces strict adherence to the relational model, as understood by those of ordinary skill in the art. Additionally, the information is stored in the cells of the database.

According to an embodiment, the second module 108 is configured (namely, is functional when in operation) to acquire the unique object identity for an object to be tracked from the first database 110. As aforementioned, an area of interest can be selected from the surveillance area based on the user input. Therefore, the second module 108 optionally filters out the required data from the first database 110 based on the selected area of interest based on the user input. It will be appreciated that the second module 108 optionally acquires unique object identity for a number of objects to be tracked in the surveillance area or the defined area of interest. Notably, the system 100 can be employed to track a plurality of objects in the surveillance area or a few particular objects or a single object in the surveillance area, as required. Furthermore, the second module 108 is configured (namely, is functional when in operation) to calculate a geospatial location of each of the identified objects in the area of interest based on a position of the plurality of sensors associated therewith. The location of each of the sensors 102 is known, therefore the one or more sensors 102 can be employed as reference points for determination of location of the identified objects in the surveillance area.

According to an embodiment, the geospatial location of each of the objects in the surveillance area is determined by homographic mapping of the surveillance area. The second module 108 is configured (namely, is functional when in operation) to transform the coordinates of an image plane from a first reference system to the corresponding coordinates in a map in a second reference system, for calculating the geospatial location of each of the identified objects in the surveillance area. Herein, the second reference system can be a ground or floor plan or any other representation of the surveillance area. For this purpose, the sensors, such as the audio beacon, the microphone arrangement, LIDAR and/or Wi-Fi, may generate a distance vector of the object therefrom; and the coordinates of the image (from the camera arrangement) and the distance vector can be transformed into a volumetric representation of the surveillance area using a three-dimensional homographic transformation.

The term "homographic mapping" as used herein refers to mapping the coordinates of an image plane to the geospatial coordinates of a ground plan or a map. The homographic mapping is a method known in the art for correcting perspective distortions or applying textures. Herein, the "ground plan" or "map" refers to a digital image of the surveillance area having at least four known coordinates and the boundary of the four known coordinates of the ground plan or map contains the other unknown coordinates that are required to be retrieved from the map. Herein, the four known coordinates of the map may be known real world positions of the four marked image points (typically a well visible feature, like a street corner or the like), and may correspond to four arbitrary points in the digital image of the surveillance area that generally enclose the surveillance area. In homographic mapping, at least four points are considered on an image plane marking a closed boundary in the form of a closed geometric shape. In such case, the geometric shape thus formed is a trapezoid. Each of the four points of the trapezoid in the image plane is transformed to the corresponding coordinates in the ground plan or map, thereby geo-referencing the coordinates of the image plane to the ground plan or map. Once a relation has been established between the coordinates of the image plane and the ground plan or map, the coordinates of each of the points within the trapezoid can be determined. It will be appreciated that every 2D or 3D point can be in any other plane in the space. Therefore, when homography exists between two planes, i.e. given four points in a plane, there always exists a relationship that transforms the given four points into corresponding four points in another plane. For this purpose, a homography matrix is determined and subsequently solved to determine the parameters that help in determining the geospatial coordinates of the area. The mapping of the coordinates from an image plane to the map or the ground plane is typically referred to as "geo-referencing".

In an example, a number of cameras, for example a plurality of cameras, are arranged in the surveillance area for acquiring images corresponding to the surveillance area. The homographic mapping of the surveillance area is achieved by dividing the image acquired for whole surveillance area into smaller constituents. Herein, the smaller constituents are optionally trapezoids. Each of four points of each of the trapezoid are mapped to the corresponding points on the ground map, thereby establishing a relation between the acquired image and the ground map. As aforementioned, the relationship between the coordinates of the image plane and the ground map plane is established by the homography matrix. For example, consider a known co-ordinate system (x,y) in a first reference system (image plane) mapped onto an unknown co-ordinate system (X,Y) in a second reference system (map plane) for applying the homographic transformation on one of the trapezoids in the acquired image of the surveillance area. The unknown coordinates are calculated using the formulae (Equation 1 and Equation 2):

$$X=(ax+by+c)/(gx+hy+1) \quad \text{Eq. 1}$$

and $$Y=(dx+ey+f)/(gx+hy+1) \quad \text{Eq. 2}$$

wherein, a, b, c, d, e, f, g and h are eight transformation parameters. Herein, a is the fixed scale factor in X direction with scale Y unchanged, b is the scale factor in X direction proportional to Y distance from origin, c is the origin translation in X direction, d is the scale factor in Y direction proportional to X distance from origin, e is the fixed scale factor in Y direction with scale X unchanged, f is the origin translation in Y direction, g is the proportional scale factors X and Y in function of X and h is the proportional scale factors X and Y in function of Y. It will be appreciated that the aforementioned equations Eq. 1 and Eq. 2 contain eight unknown parameters, thereby requiring at least four known points in both the first reference system and the second reference system. Therefore, having known four points or coordinates in the first reference system as (x1, y1), (x2,y2), (x3, y3), (x4, y4) and in the second reference system as (X1, Y1), (X2, Y2), (X3, Y3) and (X4, Y4), the transformation parameters a, b, c, d, e, f, g and h can be calculated.

Notably, the known four points in the first reference system are the coordinates of the trapezoid in the image plane and the known four points in the second reference plane are the coordinates of the trapezoid in the map/ground plane. It will be appreciated that the determination of all the eight parameters from the above homographic transformation matrix allows to transform any point or co-ordinate from the first reference system to the second reference system. Therefore, any point that lies within the co-ordinate boundaries of the trapezoid in the image plane can be geo-referenced to the corresponding coordinates of the trapezoid in the map/ground plane. Notably, the homographic mapping can be extended to mapping using more than four points, such as eight points forming the boundaries of a cuboid.

Furthermore, in order to geo-reference each of the identified objects in the image plane to the map/ground plane, each of the identified objects is first segmented to be represented in a box. Furthermore, a point is determined within the box based on the fact that the point selected within the box accurately represents the spatial depth of the identified object within the box. The term "spatial depth" as used herein refers to the apparent/average distance of the identified image from the observed space (here, the sensor or camera). The spatial depth potentially varies from one object type to another, from one object to another. In an example, the spatial depth for a person is potentially a center of the bottom line of the box. In another example, the spatial depth for vehicles is potentially a point up above 20% from the center of the bottom line of the box. The point thus obtained is then transformed into a map or a ground plan coordinates using the homographic matrix. Henceforth, each of the identified objects can be transformed into map or ground plan coordinates using the homographic matrix.

Furthermore, the second module 108 is configured (namely, is functional when in operation) to calculate a change in the geospatial location the object to be tracked from a first geospatial location to a second geospatial location. Herein, the first geospatial location and the second geospatial location are only indicative of two positions of an object being tracked. Optionally, the objects are being tracked in real-time. In such a case, the first geospatial location is the location of the object at time T1 and the second geospatial location is the location of the object at time T2. Notably, the time T2 is ahead in time than the time T1. It will be appreciated that the change in the geospatial location of each of the plurality of objects is calculated with respect to time. Furthermore, the second module 108 is configured (namely, is functional when in operation) to generate a virtual representation of the object to be tracked indicative of a movement of the object to be tracked due to change in the geospatial location thereof. The virtual representation depicts a movement of each of the identified objects with respect to time. In an example, the virtual representation of the objects to be tracked is obtained using homographic mapping as explained above. Optionally, the virtual representation of the objects to be tracked is represented in a geospatial context. The term "geospatial" as used herein refers to a presentation of movement of objects with respect to the geographical and/or geospatial data, such as Global Positioning System (GPS) data and geographic information system (GIS) data.

Furthermore, the virtual representation is generated by mapping a position of each of the identified objects in the virtual environment from the surveillance area (i.e., real-world environment). Optionally, the accuracy of mapping will depend on a number of factors, such as an area (for example, angular field of view) covered (namely, sensed) by the camera, a resolution of the camera, a position and a viewing angle of the camera, a distance of objects from the camera and the like. Notably, a high-resolution camera improves accuracy of mapping in comparison to employing a low-resolution camera. Furthermore, if a given camera is employed to focus a small area only, the accuracy of mapping obtained is higher. Additionally, a position of the camera also affects the accuracy of mapping. For example, when a camera is arranged at a low altitude with a shallow angle, perspective distortion increases, thereby leading to higher inaccuracies. Henceforth, it is preferable/desired to position the camera at a higher altitude with respect to the plane of the surveillance area. Additionally, a steeper angle for the camera is preferred for achieving an improved accuracy when in operation. Furthermore, the accuracy of mapping is also reduced with an increase of distance of the camera from the objects. Notably, objects further away from the camera appear smaller, cover (namely, are sensed by) less pixels and are consequently less accurately mapped via use of the camera.

In some embodiments, the system may include a central data base that maintains spatial location, properties and state related information for each of the identified objects, which then can be transferred to and visualized by the user(s) using their respective user device(s). The initial set of information may provide a base reference which can be manipulated based on new steam of information as being gathered by the various sensors, and thus a graphic can be generated to visually track the identified objects in the surveillance area for the user. In such embodiments, the image segmentation, object classification and the homographic mapping can be done within the camera (such as a smart camera) that obtains its parameters like the homography matrix and object classes to analyze from the central data base.

Below is provided a table (i.e. Table 1) to illustrate the accuracy of mapping with reference to a distance of four stationary objects from a camera.

TABLE 1

| Object | Distance from camera | Tile width | Horizontal accuracy | Tile height | Vertical accuracy |
|---|---|---|---|---|---|
| 1 | 5 m | 212 px | 0.5 cm | 162 px | 0.6 cm |
| 2 | 10 m | 127 px | 0.8 cm | 52 px | 2 cm |
| 3 | 15 m | 86 px | 1.2 cm | 26 px | 4 cm |
| 4 | 25 m | 57 px | 1.8 cm | 11 px | 10 cm |

As may be seen from Table 1, four objects are present in the surveillance area with a distance of 5 meters (m), 10 meters, 15 meters and 25 meters, respectively, from the camera. Herein, the accuracy of mapping decreases with an increase in distance from the camera. The first object labelled as '1' achieves highest accuracy when the first object is closest to the camera, whereas the fourth object labelled as '4' has the least accuracy in mapping as the fourth object when it is furthest from the camera.

According to an embodiment, the user device 114 is configured (namely, is functional when in operation) to render the virtual representation of a movement of the identified objects in the area of interest. Optionally, the user device 114 comprises a display to render the virtual representation of a movement of the identified objects in the surveillance area. Furthermore, the user device 114 is configured (namely, is functional when in operation) to render the virtual representation of the surveillance area for an extended view of analysis. Throughout the present disclosure, the term "user device" as used herein refers to an electronic device associated with (or used by) a user that is capable of enabling the user to perform specific tasks associated with the system 100. Furthermore, the user device 114 is intended to be broadly interpreted to include any electronic device that is susceptible to being used for voice and/or data communication over a wireless communication network. Examples of user device 114 include, but are not limited to, cellular phones, personal digital assistants (PDAs), handheld devices, wireless modems, laptop computers, personal computers, etc. Moreover, user device 114 is alternatively referred to as being a mobile station, a mobile terminal, a subscriber station, a remote station, a user terminal, a terminal, a subscriber unit, an access terminal, etc. Additionally, the user device 114 includes a casing, a data memory, a data processor, a network interface card, a microphone, a speaker, a keypad, and a display. Moreover, the user device 114 is to be construed broadly, so as to encompass a variety of different types of mobile stations, subscriber stations or, more generally, communication devices, including examples such as a combination of a data card inserted in a laptop. Such communication devices are also intended to encompass devices commonly referred to as "access terminals". In an example, different user devices 114 include, but are not limited to, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer and a tablet computer.

The user device 114 is configured (namely, is functional when in operation) to depict the objects symbolically. In an example, a person is represented as a human shaped icon, a vehicle is represented as a vehicle shaped icon, and so forth. Optionally, the user device 114 is further configured (namely, is functional when in operation) to modulate the virtual representation of the identified object in the surveillance area based on the auxiliary information. The user device 114 is configured (namely, is functional when in operation) to modulate the size of the object, color of the object, gender of the object, based on the auxiliary information. Notably, the user device 114 is communicatively coupled to the server arrangement 104. The virtual representation is generated on the server arrangement 104. The generated virtual representation is transmitted via the communication network to the user device 114 for visualization by a user thereof. Optionally, the system 100 comprises a plurality of user devices 114 communicatively coupled to the server arrangement 104. Herein, each of the plurality of user devices 114 is configured (namely, is functional when in operation) to display a movement of the objects in the area of interest in accordance with a user input. Optionally, the user device 114 has access to the entire surveillance area or specific areas of interest. The access of a user device 114 optionally depends on a designation of the user or concerned authority. In an example, a user device 114 associated with a traffic police of 21st street is allowed access only to 21st street. However, the traffic management head of the city will have access to view all the streets in the city.

Optionally, the user device 114 is configured (namely, is functional when in operation) to render the identified objects and a movement thereof in one or more of a virtual reality environment, an augmented reality environment and a mixed reality environment. Still, optionally, the user device 114 may include 2D user interfaces, such as a web viewer for a map or a ground plan. The representation of the objects in the virtual reality environment ensures a better understanding of the surveillance area. For the purpose of visualization in a virtual reality (VR) environment, augmented reality (AR) environment or a mixed reality (MR) environment, the user device is optionally implemented as a head mounted device that is configured (namely, is functional when in operation) to display the identified objects and a movement thereof.

Optionally, the second module 108 is further configured (namely, is functional when in operation) to generate graphical representations based on the statistical data of the identified objects in the surveillance area. The patterns are generated based on a historical data (data acquired in the past) of the plurality of objects in the surveillance area. In an example, a pattern is generated based on the statistics derived from monitoring a number of people on a street for six months. Optionally, the graphical representations or patterns generated are optionally in the form of a bar chart, a pie chart, a line chart, a histogram, a scatter plot, a data cube, a cartogram, a dot distribution chart, an area map, a matrix, and a heat map, and so forth. It will be appreciated that the data acquired from the sensors 102 is presented in graphically rather than numerically, thereby making the statistics for a building, street, city more perceivable and understandable by the user. The statistics and patterns generated can be used by the concerned authorities to take necessary actions. For example, data collected for increasing traffic and accidents at an alarming rate on a particular street indicates the need of a flyover or other structure. The system 100 can notify a concerned government authority to take immediate action to thereby facilitating the movement of vehicles on the street. Notably, the generated patterns are transmitted to the user device 114 for visualization by a user thereof.

According to an embodiment, the second database 112 is configured (namely, is functional when in operation) to store a list of wanted entities and optionally, one or more property associated with each of the wanted entities. The wanted entities include objects or people declared "wanted" by a government authority or any other concerned parties. The wanted entities potentially include fugitives, automobiles reported missing, people reported missing and the like. Optionally, the second database 112 is optionally maintained by a third party such as a government authority that keeps records of wanted entities. In such a case, the second database 112 optionally includes vehicle licensing databases, criminal registry databases, intelligence databases, and the like. Furthermore, the second database 112 is configured (namely, is functional when in operation) to store a property associated with a particular object. The property of a wanted entity optionally includes a size and shape of the entity, a color of the entity and so forth. In an example, one or more properties of a wanted automobile optionally includes the model of the automobile, the shape of the automobile, the size of the automobile, the license number plate of the automobile and so forth. In another example, one or more properties of a wanted person optionally include the height of the person, facial features of the person, the color of the skin of the person, the gender of the person and other visual properties and characteristics of the person. In another example, a unique identifier for the wanted entity is optionally available in the second database 112.

Optionally, the second module 108 is further configured (namely, is functional when in operation) to compare the unique object identity for each of identified objects in the surveillance area with each of the wanted entities in the second database 112. Furthermore, the second module 108 determines if the unique object identities for any of the identified objects in the surveillance area matches with one or more of the wanted entities in the second database 112. If the unique object identities for any of the identified objects in the surveillance area matches with one or more of the wanted entities, the second module 108 generates a virtual representation of the determined object with the corresponding unique object identity matching with one or more of the wanted entities.

Optionally, the second module 108 is further configured (namely, is functional when in operation) to generate an alert if the unique object identity for any of the identified objects in the surveillance area matches with one or more of the wanted entities. The alert is generated by transmitting the unique object identity of the wanted entity and the geospatial location associated therewith to the user device. The alert can be generated on the user device 114 by popping up a notification, raising an alarm, beeping continuously, short message service (SMS) and so forth. In an example, a license number plate of an identified vehicle is compared with a list of wanted entities in the second database 112. If a match is found, an alert is generated by transmitting the unique object identity and the geospatial location of the identified vehicle to the concerned authorities, such as the police department of the concerned area. Furthermore, the movement of the vehicle can be continuously tracked by the server arrangement 104 and a current location can be displayed on the user device 114. That is, the second module 108 is configured to provide the motion and potentially action pattern of the wanted entity, based on the unique object identity of the wanted entity and its location and state changes in the surveillance area. Thereby, the second module 108 can provide information on where the wanted entity came from, where it went and what it did within the surveillance area.

Optionally, the user device 114 comprises a user interface. The user interface allows a user to generate a user input to search for one or more properties associated with a particular object in order to determine a current location of the object. Throughout the present disclosure, the term "user interface" as used herein refers to a structured set of user interface elements rendered on a display screen. Optionally, the user interface (UI) rendered on the display screen is generated by any collection or set of instructions executable by an associated digital system. Additionally, the user interface (UI), when in operation interacts with the user to convey graphical and/or textual information and receive input from the user. Specifically, the user interface (UI) used herein is a graphical user interface (GUI). Furthermore, the user interface (UI) elements refer to visual objects that have a size and position in user interface (UI). A user interface element is optionally visible, though there potentially arise situations when a user interface element is hidden from visual view. A user interface control is considered to be a user interface element. Text blocks, labels, text boxes, list boxes, lines, and images windows, dialog boxes, frames, panels, menus, buttons, icons, etc. are examples of user interface elements. In addition to size and position, a user interface element optionally has other properties, such as a margin, spacing, or the like. In an example, a user is able to search for a vehicle by entering a license number of the vehicle. The system 100 searches for the vehicle in the surveillance area and notifies the user in case of a match being identified, wherein notification is provided by generating an alert. Furthermore, the user device 114 associated, for example, with the government authority renders (namely, generates a visual representation of) a movement of the tracked vehicle.

According to an embodiment, the plurality of sensors comprises 102 a microphone arrangement to acquire sound in the surveillance area. The term "microphone arrangement" as used herein refers to an array of devices configured (namely, are functional when in operation) to acquire data in a form of sound energy from an environment, convert the sound energy into electrical signals and transmit corresponding acquired data to the server arrangement 104 for further processing. The first module 106 is configured (namely, is functional when in operation) to analyze the sound acquired by the microphone arrangement for keywords or content in the sound. A number of audio processing techniques is optionally employed to extract keywords from the acquired sound. There are several audio processing techniques known in the art such as audio filtering, frequency analysis, Fast Fourier Transform (FFT) spectral analysis, audio signature matching, noise cancellation, and the like. In an example, the keywords extracted from the acquired sound are optionally words from a natural language, familiar sounds such as the siren of an ambulance, gunshots and the like. In another example, the content extracted from the acquired sound is optionally a voice of a person, especially a voice of a wanted entity. The acquired sound is analyzed for a presence of one or more pre-determined keyword and content therein, from a set of predetermined keywords and contents. If the analyzed sound contains relevant keywords or content, then the first module 106 calculates a point of origin of the acquired sounds in the surveillance area related with the presence of one or more of predetermined keyword and content therein based on a direction thereof with respect to the microphone arrangement. Furthermore, the second module 108 is configured (namely, is functional when in operation) to generate a virtual representation of the object associated with the acquired sounds related with the presence of one or more of predetermined keyword and content, with the calculated point of origin being the geospatial location for the object. In an example, the sound acquired by the microphone arrangement is optionally analyzed for the voice of a wanted entity. Then, an initial point of origin of the voice is calculated when the voice is acquired for the first time by the microphone arrangement. Once an initial point of origin is determined, the voice can be tracked accordingly as the array of microphones in the surveillance area detects and tracks the presence of the same voice in the surveillance area.

Optionally, the second module 108 compares the extracted keywords or content with a pre-determined set of keywords or contents. The pre-determined set of keywords or content optionally includes keywords such as "HELP" and other relevant sounds familiar to crying, shouting and the like. Furthermore, if the extracted keywords or content matches the pre-determined set of keywords or content, then an alert is generated on the user device of the concerned authorities. Optionally, the system 100 comprises video cameras and microphone arrangements. The server arrangement 104 is configured (namely, is functional when in operation) to synchronize the output data streams from the video cameras with the output audio streams from the microphone arrangement, to obtain meaningful information from the surveillance area.

According to another embodiment, the plurality of sensors 102 comprise Bluetooth® beacons to be used to determine an accurate location of a plurality of electronic devices and the associated users thereof. It will be appreciated that Bluetooth® Low Energy (BLE) based beacons have two roles, namely broadcasting (by a beacon device) and receiving (by a sensing device). In an example, a surveillance area optionally includes three Bluetooth® sensing devices for triangulation. Triangulation calculates the intersection of common points of one set of coordinates using the properties of a triangle. Herein, the electronic device associated with a user optionally serves as a Bluetooth® beacon by transmitting low frequency Bluetooth® waves. In particular, a plurality of electronic devices optionally serves as beacons by transmitting Bluetooth® energy that is received by the Bluetooth® sensing devices.

To obtain an accurate position of the electronic device, the Bluetooth® sensing devices are optionally arranged, thereby forming a triangle in the surveillance area. When in operation, the electronic device transmits a low energy Bluetooth® signal. The signal is received by a first sensing device at a distance D1, by a second sensing device at a distance D2, and by a third sensing device at a distance D3. It will be appreciated that according to the first sensing device the electronic device is in a circle of radius D1, however the exact location is not determined. With respect to the first sensing device and the second device, the electronic device is optionally present at two points obtained by intersection of the circle of radius D1 and a circle of radius D2. Furthermore, the ambiguity of position of the electronic device is solved with respect to the third sensing device by determining a single intersection point (or location) which is obtained by intersection of the circle of radius D1, the circle of radius D2 and a circle of radius D3. Such an arrangement is employed for determining an accurate location of a plurality of electronic devices and the associated users thereof, by the principle of triangulation (even when the user is in motion).

In another example, the electronic device optionally serves a Bluetooth® sensing device, and receives beacon messages to indicate a presence in a surveillance area. For example, a Bluetooth® beacon is arranged at the entrance of a shopping mall. Every electronic device that passes the entrance of the mall receives a Bluetooth signal from the Bluetooth® beacon device indicating a presence of an associated user at that particular location (here, shopping mall). Optionally, the plurality of sensors is implemented as an array of audio beacons arranged in the surveillance area. Notably, the audio beacons work in a same manner to the Bluetooth® beacons. However, the audio beacons transmit inaudible frequencies such as ultrasonic waves for communication between two or more devices. It will be appreciated that the process of triangulation to determine the accurate location of the objects to be tracked is same for both Bluetooth® beacons as well as audio beacons.

Figure 2A:
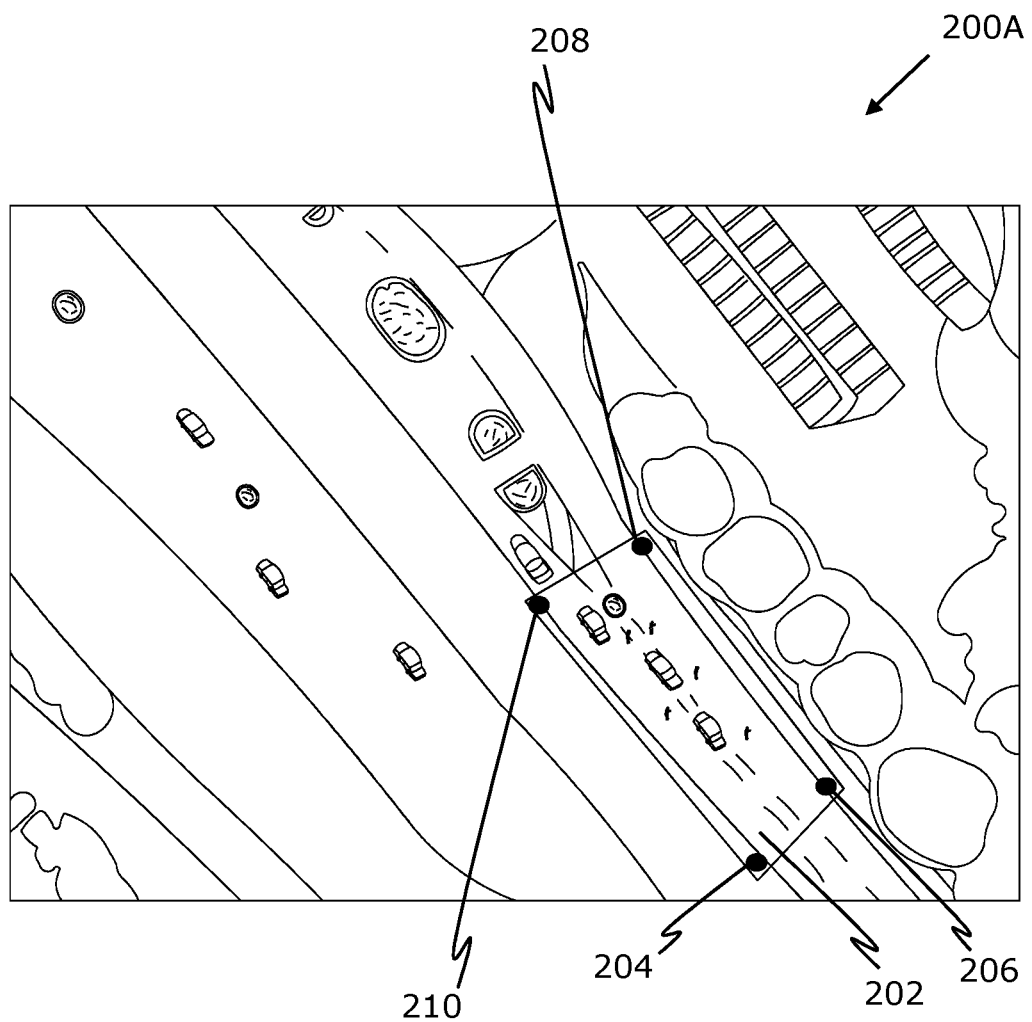
FIGS. 2A to 2C are illustrations of a surveillance area depicting identified objects and a virtual representation thereof, in accordance with an embodiment of the present disclosure.

Referring to FIG. 2A, the surveillance area 200A comprises a plurality of sensors and a number of objects such as vehicles, people, trees, and obstacles. Furthermore, the surveillance area 200A includes an area of interest 202 within some pre-defined coordinates. Herein, the area of interest 202 is a portion of a street in the surveillance area 200A. The area of interest 202 is determined based on a user input. Furthermore, one or more sensors are selected from the plurality of sensors that efficiently cover the area of interest 202. Herein, a first sensor 204, a second sensor 206, a third sensor 208, and a fourth sensor 210 are selected that efficiently cover the area of interest 202. Optionally, the first sensor 204 is a camera, the second sensor 206 is a microphone, the third sensor 208 is a Bluetooth® beacon, and the fourth sensor 210 is a camera placed at a different location than the first sensor 204. The data acquired from the sensors 204, 206, 208 and 210 is transmitted to the server arrangement (such as the server arrangement 104 of FIG. 1) for further processing.

Figure 2B:
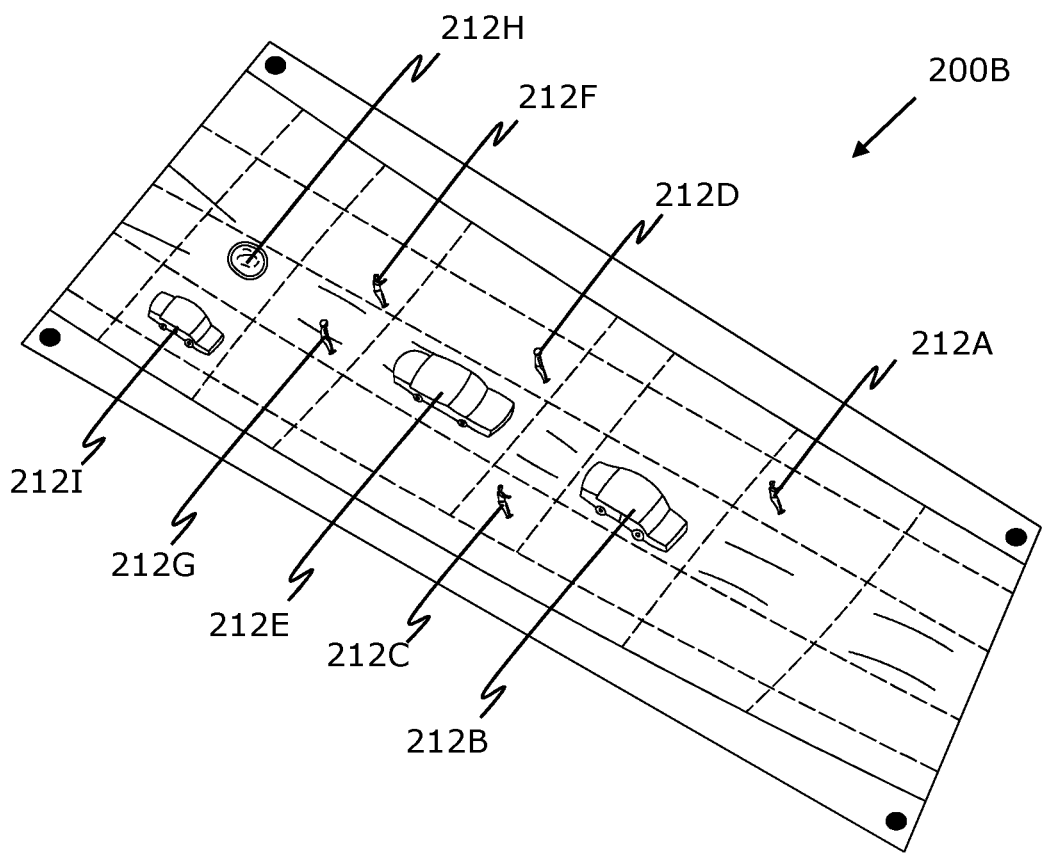

Referring to FIG. 2B, there is illustrated an enlarged view 200B of the area of interest 202, in accordance with an embodiment of the present disclosure. As shown, the area of interest 202 is segmented to distinguish various objects therein. Notably, the first module (such as the first module 106 of FIG. 1) employs segmentation techniques to identify the objects present in the area of interest 202. Herein, the data acquired by the first sensor 204 and the fourth sensor 210 is analysed. The segmented objects comprise a first object 212A, a second object 212B, a third object 212C, a fourth object 212D, a fifth object 212E, a sixth object 212F, a seventh object 212G, an eighth object 212H and a ninth object 212I. Furthermore, the first module applies feature extraction techniques to identify an object type of each of the objects. As identified by the first module, the first object 212A is a person, the second object 212B is a vehicle, the third object 212C is a person, the fourth object 212D is a person, the fifth object 212E is a vehicle, the sixth object 212F is a person, the seventh object 212G is a person, the eighth object 212H is an obstacle and the ninth object 212I is a vehicle. Furthermore, the first module extracts information from each of the objects and generates a unique object identity for each of the identified objects. The unique object identity associated with each of the identified objects is stored in a first database (such as the first database 110 of FIG. 1).

Figure 2C:
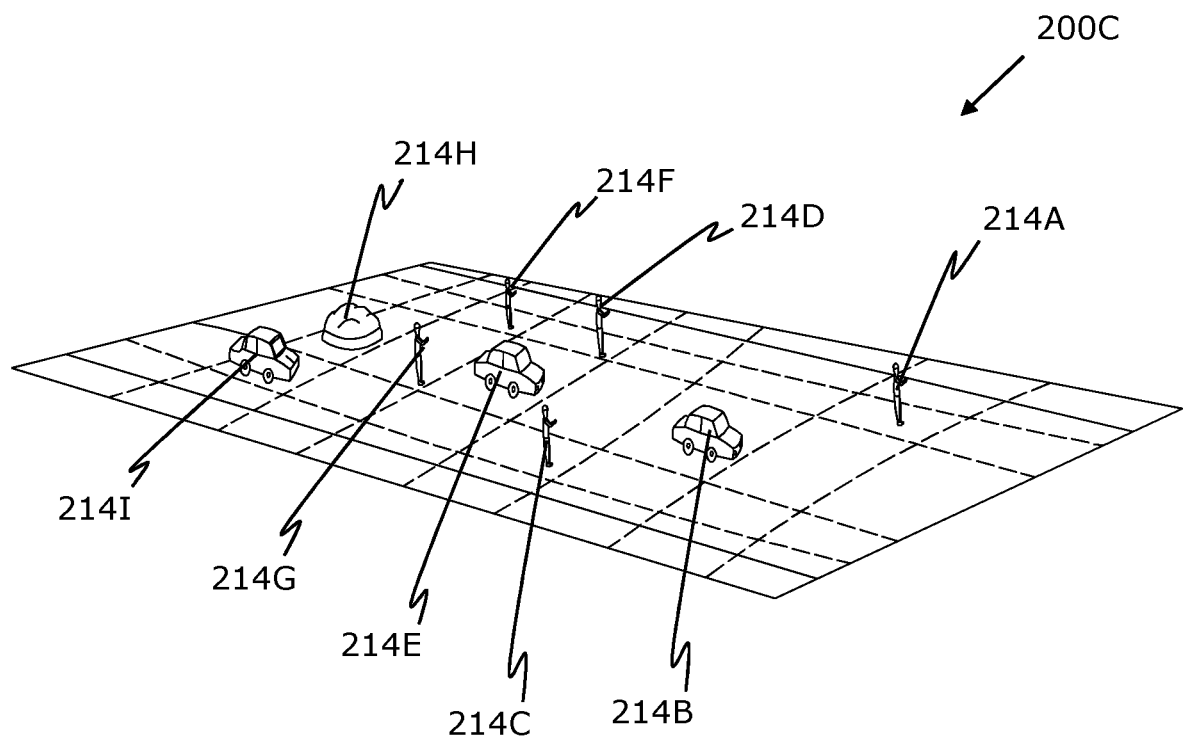

Referring to FIG. 2C, there is illustrated a virtual representation 200C depicting each of the objects identified in FIG. 2B, in accordance with an embodiment of the present disclosure. As shown, the virtual representation 200C depicts symbolic representations of each of the objects identified in FIG. 2B, that is symbolic representations 214A, 214B, 214C, 214D, 214E, 214F, 214G, 214H and 214I of the objects 212A, 212B, 212C, 212D, 212E, 212F, 212G, 212H and 212I respectively. The unique object identity of each of the objects to be tracked is acquired from the first database by the second module. The second module also determines a geospatial location of each of the identified objects with reference to a known location of the sensors 204, 206, 208 and 210. Furthermore, the second module calculates a movement of each of the objects and reflects (namely, depicts or displays) the movement on a user device (such as the user device 114 of FIG. 1). Notably, the user device displays a movement of each of the symbolic representations 214A, 214B, 214C, 214D, 214E, 214F, 214G, 214H and 214I of the objects 212A, 212B, 212C, 2120, 212E, 212F, 212G, 212H and 212I respectively.

Figure 3:
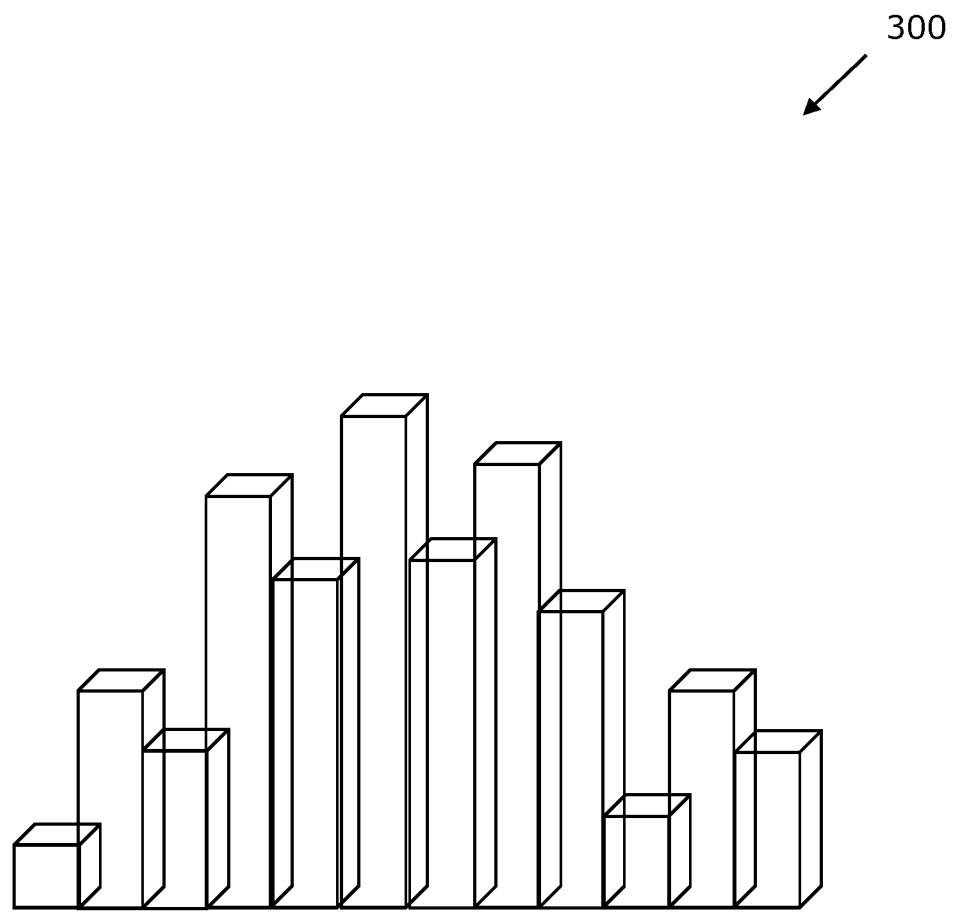
FIG. 3 is an illustration of graphical representation of data acquired from sensors of FIG. 2A, in accordance with an embodiment of the present disclosure.

Referring to FIG. 3, there is illustrated a graphical representation 300 of the data acquired from the sensors of FIG. 2A, in accordance with an embodiment of the present disclosure. As shown, the data acquired is represented in the form of a bar graph. Herein, the bar graph represents a rush on a street on an hourly basis for 12 hours in a day from 700 hours in the morning to 1900 in the evening. It is evident from the bar graph that the rush on the street is at a maximum between 1000 hours to 1500 hours. Therefore, a graphical representation of data facilitates improved understanding of the user and is less time consuming to appreciate at the same time.

Figure 4:
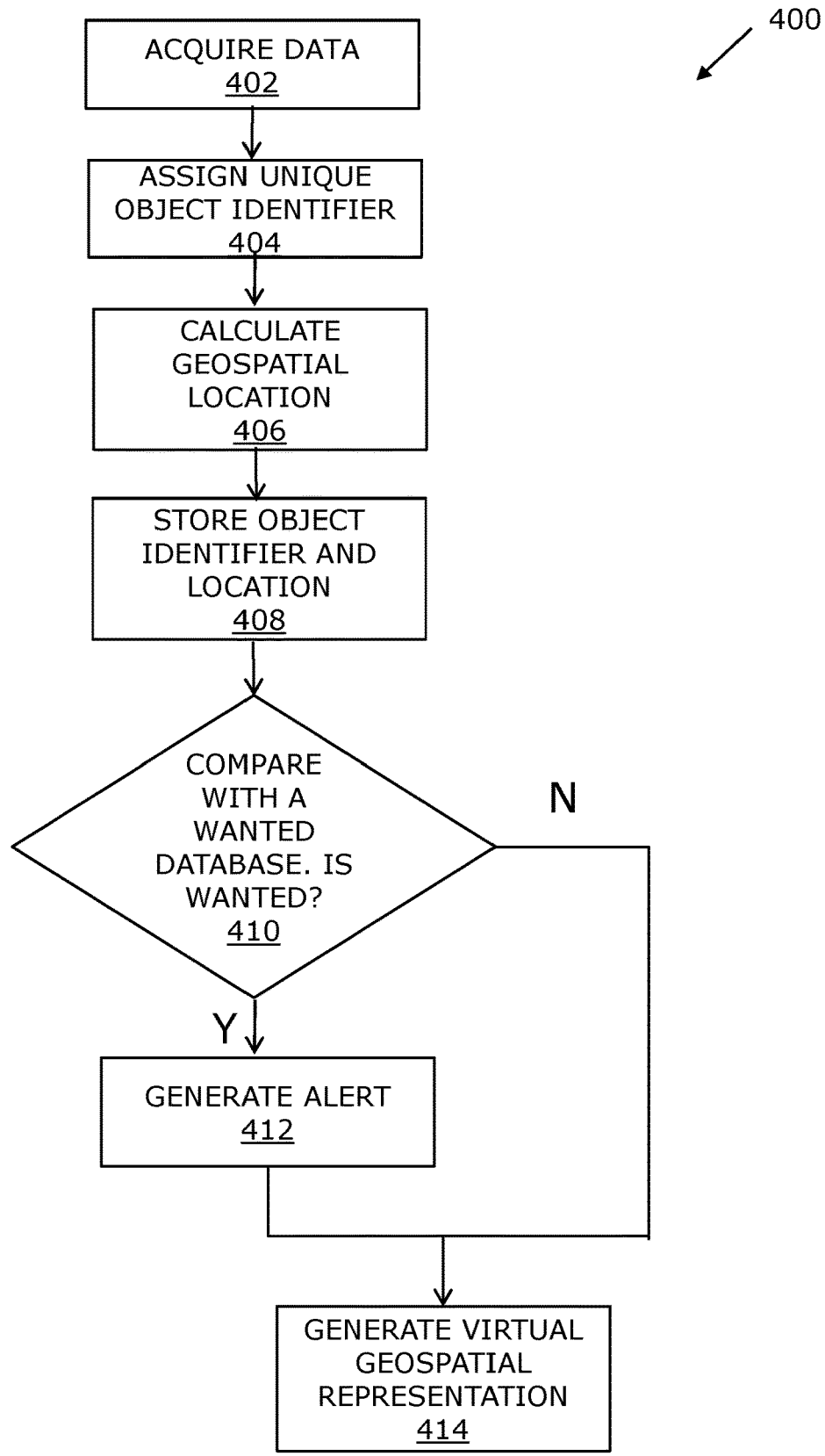
FIG. 4 is an illustration of a flowchart representing a process for tracking and visualizing a wanted entity, in accordance with an embodiment of the present disclosure.

Referring to FIG. 4, there is illustrated a flowchart 400 representing a process for tracking and visualizing a wanted entity, in accordance with an embodiment of the present disclosure. At a step 402, data is acquired from the plurality of sensors in the surveillance area. At a step 404, the data acquired from the plurality of sensors is analyzed to identify objects and a unique object identity is generated for each of the plurality of identified objects. At a step 406, a geospatial location of each of the identified object is calculated. At a step 408, the unique object identity and the geospatial location of each of the identified objects is stored in a first database. At a step 410, the unique object identity of each of the objects in the surveillance area is compared with the entries of a second database comprising a list of wanted entities. If a match is found, a path 'Yes' is followed, if no match is found path 'No' is followed. When the path 'Yes' is followed, a step 412 is executed and an alert is generated on a user device associated with a concerned authority. Furthermore, a step 414 is executed and the wanted entity is tracked continuously by generating a virtual representation of a movement of the wanted entity. When the path 'No' is followed, the step 414 is executed directly without generating an alert.

The present disclosure also relates to the method of (namely, method for) tracking and visualizing objects in a surveillance area. Various embodiments and variants disclosed above apply mutatis mutandis to the method.

Figure 5:
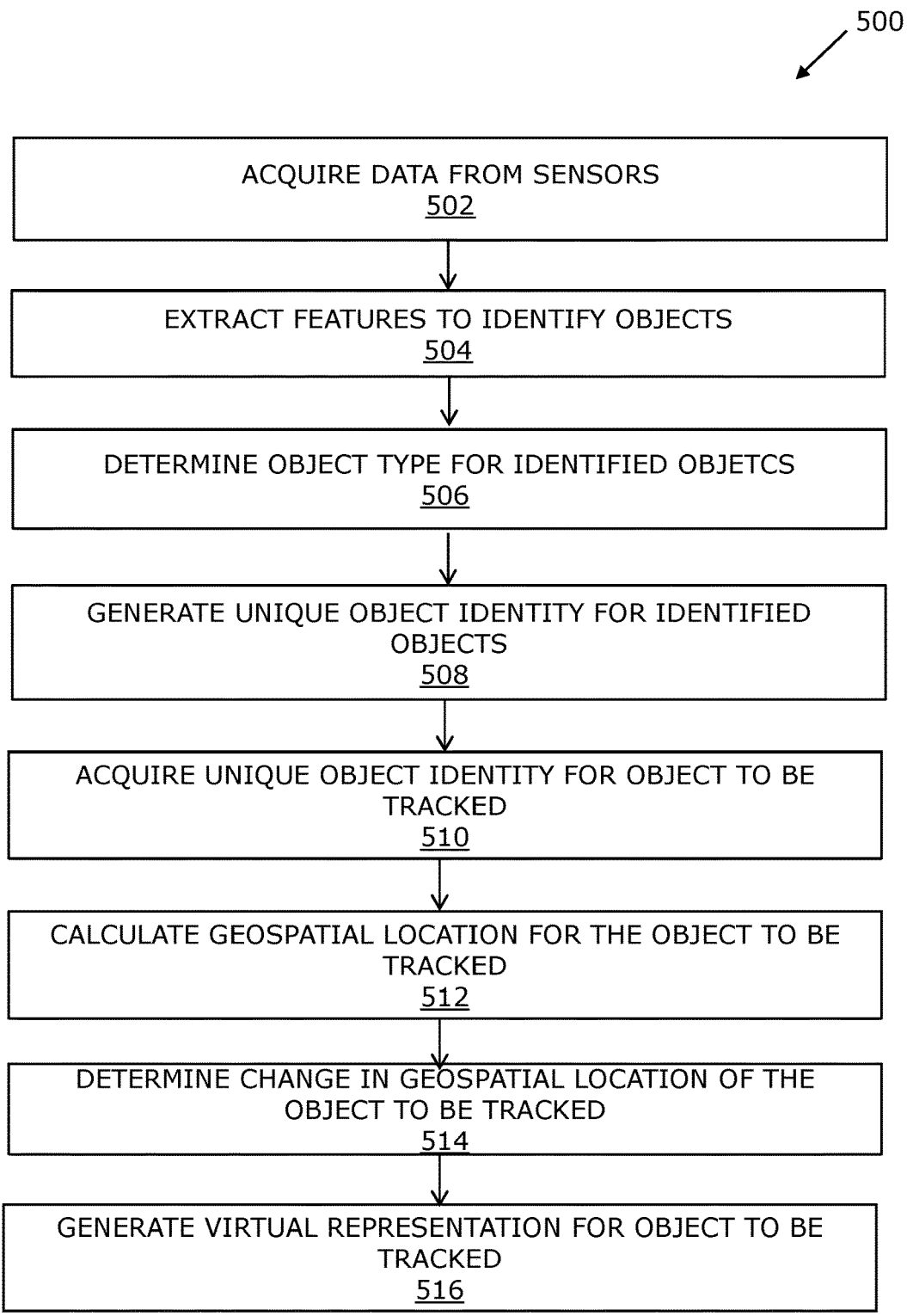
FIG. 5 is an illustration of steps of a method for tracking and visualizing objects in a surveillance area, in accordance with an embodiment of the present disclosure.

Referring to FIG. 5, there are illustrated steps of a method 500 of (namely, method for) tracking and visualizing objects in a surveillance area, in accordance with an embodiment of the present disclosure. At a step 502, data is acquired from a plurality of sensors in the surveillance area. At a step 504, features are extracted from the acquired data to identify objects in the surveillance area. At a step 506, an object type for each of the identified objects is determined based on the extracted features of the respective objects. At a step 508, a unique object identity is generated based on the object type for each of the identified objects in the surveillance area. At a step 510, the unique object identity for an object to be tracked is acquired. At a step 512, a geospatial location of the object to be tracked is calculated based on a position of the plurality of sensors associated therewith. At a step 514, a change in the geospatial location of the object to be tracked is determined in the surveillance area. At a step 516, a virtual representation of the object to be tracked is generated, indicative of a movement of the object to be tracked due to change in the geospatial location thereof.

The steps 502 to 516 are only illustrative and other alternatives can also be provided where one or more steps are added, one or more steps are removed, or one or more steps are provided in a different sequence without departing from the scope of the claims herein.

Optionally, the method further comprises rendering (namely, presenting or displaying), by using a user device, the virtual representation of a movement of the identified objects in the surveillance area.

Optionally, the method comprises transforming the coordinates of an image plane from a first reference system to the corresponding coordinates in a map in a second reference system, for calculating the geospatial location of each of identified objects in the surveillance area.

Optionally, the method further comprises:
(i) acquiring a list of wanted entities and, optionally, one or more properties associated with each of the wanted entities;
(ii) comparing the unique object identities for each of the identified objects in the surveillance area with each of the wanted entities in the list of wanted entities;
(iii) determining if the unique object identity for any of the identified objects in the surveillance area matches with one or more of the wanted entities; and
(iv) generating a virtual representation of the determined object with the object identity matching with one or more of the wanted entities.

Optionally, the method further comprises generating an alert if the unique object identity for any of the identified objects in the surveillance area matches with one or more of the wanted entities.

Optionally, the method further comprises generating graphical representations based on statistical data of the identified objects in the surveillance area.

Optionally, the method further comprises rendering the generated graphical representation on a user device, based on the movement of the identified objects.

The system of the present disclosure is configured to spatially position objects in a surveillance area. The present system eliminates the need for a human or a team of humans to watch live security monitors and keep track of objects in the surveillance area. The present system helps to translate objects present in the surveillance area into a digital representation of the surveillance area. The present system further helps to overcome privacy issues as the object is given a unique object identity and thus the object is tracked anonymously. The present system is also capable of determining the state of detected objects based on their visited locations. For example, a person being spotted in a contaminated area of the surveillance area can be considered as infected and further be tracked throughout the surveillance area to check for history of locations visited (e.g., for decontamination purposes).

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

APPENDIX

Simplified Cross-Camera Tracking Algorithm

The algorithm requires an AI thread to be available or an on-edge computing device. These can be provided via use if global AI-software executed on a computing device, connected via a data communication network.

A per-camera algorithm, when in operation, maintains two tables:
(i) a present image frame; and
(ii) a preceding image frame,
wherein each table includes columns defining following parameters:
object_id, object_class, cam_id, pos_x, pos_y, state, appearance vector.

In operation:
(a) an image frame is acquired from a camera (cam_id);
(b) a run image segmentation (known in the art) is implemented on the image frame, to detect objects;
(c) for each detected object: a run classification is performed, there is calculated an appearance vector or feature_id (known in the art) in respect of the detected object, and there is assigned a unique object_id to the detected object, there is calculated a world position using homography (described before);
(d) all detected objects of a same given class are compared in last frame table;
(e) if the position is the same, there is inherited an object_id from the last frame table;
(f) if the position of the detected object is closely matched (within a threshold) and appearance is very similar, there is inherit an associated object_id from the last_frame_table; else there is sent object_id, object_class, cam_id, pos_x, pos_y, state, appearance vector to global AI service to compare vs. objects seen on other cameras by comparing world_position and appearance;
(g) there is receive an object_id if a match is found; else, send object_id, object_class, cam_id, pos_x, pos_y, state, appearance vector to global AI service to compare vs. objects ever seen before by comparing appearance (including extracted features);
(h) there is received object_id if a match is found, wherein, if an object position or state have changed vs last_frame_table, there is appended an object_id, object_class, cam_id pos_x, pos_y, appearance vector to this frame table.

(j) the algorithm then proceeds to a next object whose frame table sent to the global AI-service, and this frame is then copied to the last frame table.

In the algorithm, it will be appreciated that the global AI-service maintains two types of tables:

(i) a few cross-camera identification tables that correspond to the speed of the AI and objects, (e.g.: frame-1, frame-2, frame-3 etc.) so objects moving from camera to camera are discovered. These tables are updated and replaced round-robin (i.e. continuous in a cyclical manner);

(ii) a global object_id table that is maintained over a longer period of time, e.g. a month or longer.

The global object_id table only contains object_id and appearance vector and extracted features to potential id objects that have not been spotted in the same camera before or in any other camera.

What is claimed is:

1. A system that tracks and visualizes objects in a surveillance area, the system comprising:
   a plurality of sensors arranged in the surveillance area for acquiring data;
   a first database;
   a server arrangement communicatively coupled to the plurality of sensors to obtain the acquired data therefrom, the server arrangement comprising:
      a first module configured to:
         extract features from the obtained data to identify objects in the surveillance area;
         determine an object type for each of the identified objects in the surveillance area based on the extracted features of the respective objects;
         generate a unique object identity and an object class based on the object type for each of the identified objects in the surveillance area;
         calculate a geospatial location of each of the identified objects based on positions of the plurality of sensors; and
         store the unique object identity and the object class for each of the identified objects along with the extracted features and the geospatial location of that identified object in the first database; and
      a second module configured to:
         extract features from newly-obtained data and compare the extracted features with the features of previously-identified objects stored in the first database, to re-identify an object to be tracked;
         acquire the unique object identity, object class and a last-known geospatial location for the object to be tracked from the first database;
         provide object class specific mapping coordinates specifying pixel coordinates within an object's bounding box in an image plane to determine source coordinates to be mapped onto a map plane;
         transform the source coordinates of the image plane from a first reference system to the corresponding coordinates in the map plane in a second reference system for calculating a new geospatial location of the object to be tracked in the surveillance area;
         determine a change in the geospatial location and a change in state of the object based on the geospatial location of the object to be tracked in the surveillance area;
         determine a motion and/or action pattern of the object based on the change in the geospatial location and the change in state of the object in the surveillance area;
         associate the motion and/or action pattern of the object with the unique object identity of the object;
         generate a virtual representation of the surveillance area indicating a movement of the object within the surveillance area based on the change in the geospatial location, and the motion and/or action pattern of the object; and
         generate graphical representations for the virtual environment based on historic statistical data of the motion patterns and/or action patterns of the identified objects in the surveillance area.

2. The system according to claim 1, wherein the server arrangement is associated with a second database having a list of wanted entities and, optionally, one or more properties associated with each of the wanted entities.

3. The system according to claim 2, wherein the second module is further configured to:
   compare the unique object identities for each of the identified objects in the surveillance area with each of the wanted entities in the list of wanted entities;
   determine if the unique object identities for any of the identified objects in the surveillance area matches with one or more of the wanted entities; and
   generate a virtual representation of the determined object with the unique object identity matching with one or more of the wanted entities.

4. The system according to claim 3, wherein the second module is further configured to generate an alert if the unique object identity for any of the identified objects in the surveillance area matches with one or more of the wanted entities.

5. The system according to claim 1, wherein the plurality of sensors comprises a microphone arrangement to acquire sounds in the surveillance area, and
   wherein the first module is configured to:
      analyze the acquired sound for presence of one or more of predetermined keyword and content therein, from a set of predetermined keywords and contents; and
      calculate a point of origin of the acquired sounds in the surveillance area related with the presence of one or more of predetermined keyword and content therein based on a direction thereof with respect to the microphone arrangement, and
   wherein the second module is configured to:
      generate a virtual representation of the object associated with the acquired sounds related with the presence of one or more of predetermined keyword and content, with the calculated point of origin being the geospatial location for the object.

6. The system according to claim 1, wherein the plurality of sensors comprises one or more of: a camera, a LIDAR, a cell tower, a Bluetooth® beacon and an audio beacon.

7. The system according to claim 1, wherein the first module is further configured to analyze the acquired data from the plurality of sensors to extract auxiliary information pertaining to objects in the surveillance area, and wherein the second module is further configured to modulate the virtual representation of the object to be tracked based on the auxiliary information extracted therefor.

8. The system according to claim 1, further comprising a user device communicatively coupled to the server arrangement, wherein the user device is configured to render the virtual representation of a movement of the identified objects in the surveillance area.

9. The system according to claim 8, wherein the user device is further configured to render the generated graphical representation based on the movement of the identified objects.

10. The system according to claim 8, wherein the user device is configured to visualize the identified objects in one or more of: a virtual reality environment, an augmented reality environment, a mixed reality environment and a web viewer.

11. The system according to claim 8, further comprising a user interface associated with a user device, wherein the user interface allows a user to generate a user input to search for one or more properties associated with a particular object in order to determine a current location thereof.

12. A computer implemented method for tracking and visualizing objects in a surveillance area, the method comprising:
   acquiring data from a plurality of sensors in the surveillance area;
   extracting features from the acquired data to identify objects in the surveillance area;
   determining an object type for each of the identified objects based on the extracted features of the respective objects;
   generating a unique object identity based on the object type for each of the identified objects in the surveillance area;
   calculating a geospatial location of each of the identified objects based on positions of the plurality of sensors;
   storing the unique object identity for each of the identified objects along with the extracted features and the geospatial location of that identified object;
   extracting features from newly-obtained data and comparing the extracted features with the features of previously-identified objects to re-identify an object to be tracked;
   acquiring the unique object identity and a last-known geospatial location for the object to be tracked;
   providing object class specific mapping coordinates specifying pixel coordinates within an object's bounding box in an image plane to determine source coordinates to be mapped onto a map plane;
   transforming the source coordinates of the image plane from a first reference system to the corresponding coordinates in the map plane in a second reference system for calculating a new geospatial location of the object to be tracked in the surveillance area;
   determining a change in the geospatial location and a change in state of the object based on the geospatial location of the object to be tracked in the surveillance area;
   determining a motion and/or action pattern of the object based on the change in the geospatial location and the change in state of the object in the surveillance area;
   associating the motion and/or action pattern of the object with the unique object identity of the object;
   generating a virtual representation of the surveillance area indicating a movement of the object within the surveillance area based on the change in the geospatial location, and the motion and/or action pattern of the object; and
   generating graphical representations for the virtual environment based on historic statistical data of the motion patterns and/or action patterns of the identified objects in the surveillance area.
   generating graphical representations for the virtual environment based on historic statistical data of the motion patterns and/or action patterns of the identified objects in the surveillance area.

13. The method according to claim 12 further comprising,
   acquiring a list of wanted entities and, optionally, one or more properties associated with each of the wanted entities;
   comparing the unique object identities for each of the identified objects in the surveillance area with each of the wanted entities in the list of wanted entities;
   determining if the unique object identity for any of the identified objects in the surveillance area matches with one or more of the wanted entities; and
   generating a virtual representation of the determined object with the unique object identity matching with one or more of the wanted entities.

14. The method according to claim 13, further comprising generating an alert if the object identity for any of the identified objects in the surveillance area matches with one or more of the wanted entities.

15. The method according to claim 12, further comprising rendering, by a user device, the virtual representation of a movement of the identified objects in the surveillance area.

16. The method according to claim 12, further comprising rendering the generated graphical representation on a user device, based on the movement of the identified objects.

* * * * *